Figure 1:
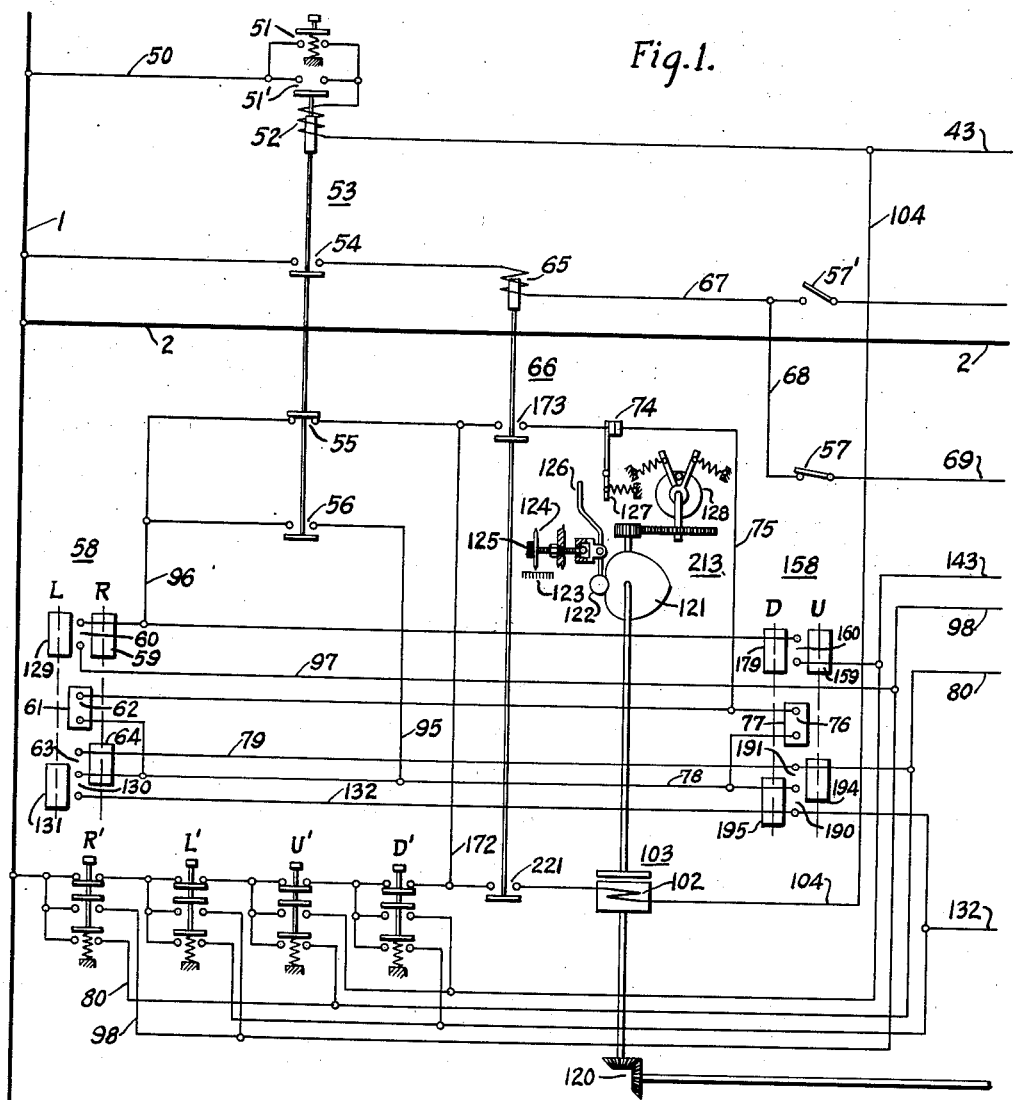

Nov. 30, 1937.   G. E. KING   2,100,745
MOTOR OPERATED FEED CONTROL
Filed April 24, 1934   2 Sheets-Sheet 1

WITNESSES:
Leon J. Jaja
Paul E. Friedemann

INVENTOR
George E. King.
BY
W. R. Coley
ATTORNEY

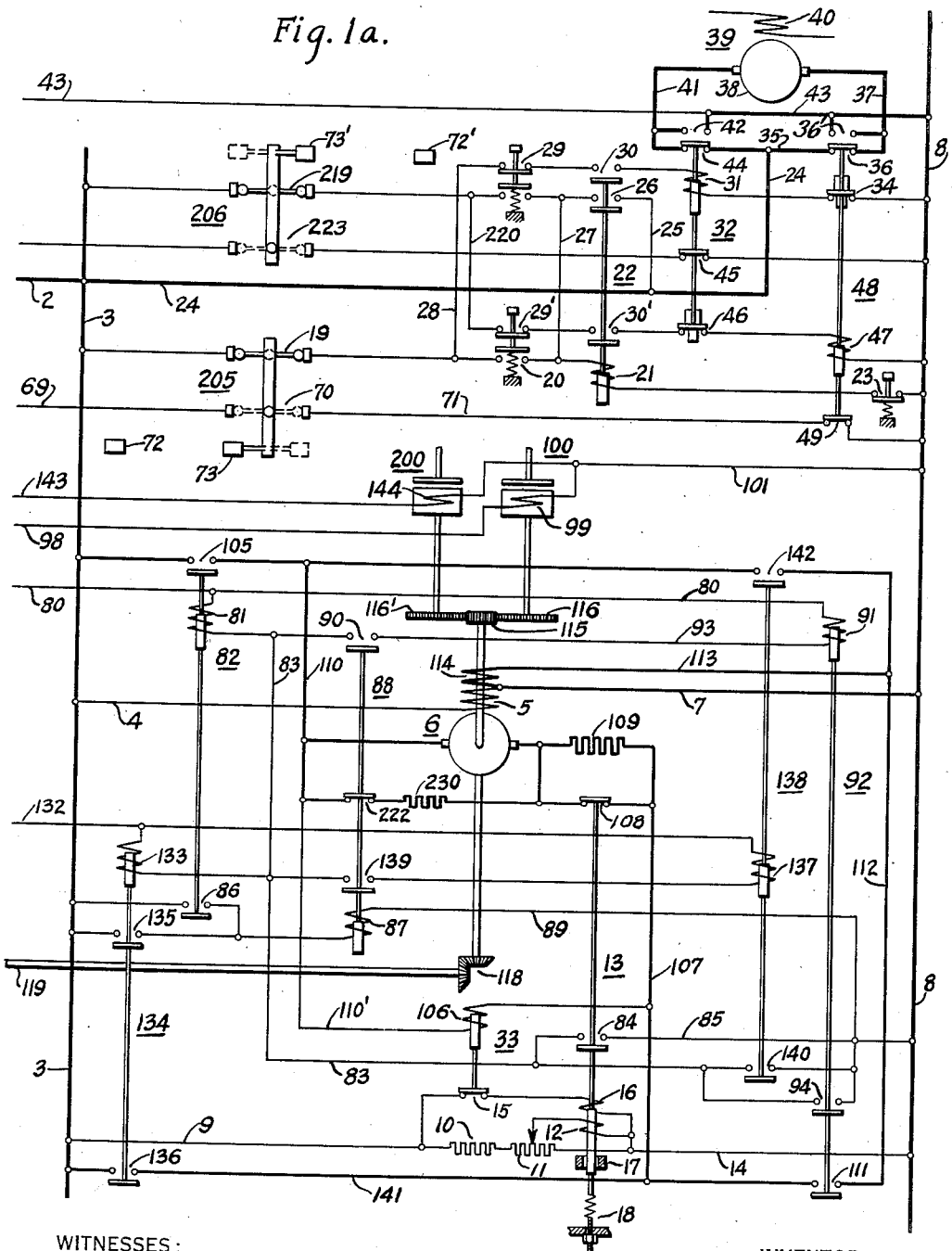

Patented Nov. 30, 1937

2,100,745

UNITED STATES PATENT OFFICE 2,100,745

MOTOR OPERATED FEED CONTROL

George E. King, Wilkinsburg, Pa., assignor to Westinghouse Electric & Manufacturing Company, East Pittsburgh, Pa., a corporation of Pennsylvania Application April 24, 1934, Serial No. 722,097

11 Claims. (Cl. 90—49)

My invention relates generally to devices for controlling the operating characteristics of motor-driven machines, and it has special relation to control systems for controlling within preselected limits the movement of elements of motor-driven machines.

More particularly, my invention relates to control systems including spring-reset limit switches which may be used as measuring and controlling devices for machines, such as planers, millers, grinders, screw-down mechanisms for rolling mills, shears, saws, or any other machine where a feeding motion or a retrieving motion of a machine element in a given direction is to take place periodically in definite increments or decrements of distance.

One object of my invention, generally stated, is the provision of a measuring machine that shall be simple in structure, capable of being readily and economically manufactured and efficient and reliable in operation.

A more specific object of my invention is to control the direction of operation of a motor and, more particularly, to control, within substantially definite limits, the number of revolutions of an electric motor driving a screw-down mechanism of a rolling mill, a tool-feeding mechanism for a planer or similar machine.

A broad object of my invention is to control the limit of travel of a motor-driven device by controlling the limit of the angular movement of the motor armature, yet making the limit of travel of the motor-driven device substantially independent of the inertia of the armature of the motor and other moving parts caused to move by said motor.

It is also a broad object of my invention to preselect the distance of travel of a machine element of a motor-driven machine, making such distance of travel substantially independent of the inertia of the motor and moving machine elements.

A further object of my invention is to provide a measuring device which may be set to make a predetermined measurement and which will, upon completion of the measurement, automatically stop and reset itself to repeat the measurement when it is again started in operation.

It is also an object of my invention to selectively limit the extent of movement of a machine element and to substantially prevent any overtravel of the machine element, the movement of which is to be controlled.

Figure 2:
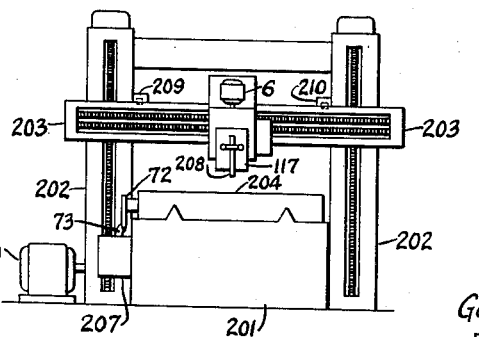

Other and more specific objects of my invention will readily become apparent from a study of the following specification, when taken in conjunction with the accompanying drawings, in which:

Figures 1 and 1a jointly constitute a diagrammatic view of an electrical control system for controlling the operation of electric motors and the elements driven thereby in response to a spring-reset limit switch constituting a measuring device; and Fig. 2 shows, somewhat schematically, the mechanical arrangement of a planer and the machine elements controlled by the motors associated with the planer.

Referring to the drawings, and more particularly to Fig. 2, a planer 201 is shown as comprising standards 202, a cross-rail 203 for carrying the tool-head 117 and the motor 6 for effecting a feeding operation of the tool-head 117 up or down or for effecting a feeding operation of the tool-head 117 toward the right or left, as desired. The main motor 39 is adapted to operate the planer platen 204 in a reciprocatory manner, and the planer platen is provided with a plurality of staggered dogs 72 and 72' which cooperate with the lever arms 73 and 73' of the limit switches 205 and 206 mounted in the casing 207.

When the platen 204 moves in the forward or "cut" direction, the tool 208 operates on a workpiece on the platen with a cutting operation. On the return stroke, no cutting takes place. On the next forward stroke of the platen the tool, to make a cut, must be moved in such a direction that it will not traverse the same path.

During the normal operation of the planer, it is necessary that the tool 208 carried by the tool-head 117 be shifted or fed to the right or left, or up or down, as desired, either at the end of the cutting stroke or at the end of the return stroke, or, when desirable, at the end of both strokes.

The tool-feeding operation is effected by the motor 6, and the control for this motor and the portions thereof coacting with this motor. A spring-reset limit switch or measuring relay 213 is mechanically and electrically interconnected with the control system for the main motor 39 in such a manner that the tool may be fed to the right or to the left, or up or down, at the end of either or both of the strokes of the planer platen.

The tool-head 117 is adapted to cooperate with a pair of limit switches 209 and 210. These limit switches 209 and 210 are adapted to stop motor 6 when the tool 208 has been moved to its extreme positions.

The system of control shown in Figs. 1 and 1a includes the main motor 39 for operating the planer platen in a reciprocatory manner. This main motor is controlled in its direction of operation by a pair of directional contactors 32 and 48, which are in turn controlled by the limit switches 205 and 206 and the control relay 22. To select the proper direction of rotation during the starting of the main motor 39, push-button switches 29 and 29' are provided. The function of these switches will become more apparent from a study of the sequence of operation given more in detail hereinafter.

The planer shown in Fig. 2 is provided with the tool-head 117 on the cross-rail 203, and to move the tool 208 up or down an electro-magnetic clutch 200 is provided, which clutch cooperates with the reversing motor 6 mounted as shown in Fig. 2 at some convenient point on the planer. In other words, when coil 144 of the electromagnetic clutch 200 is energized, the tool 208 may be moved up or down depending upon the direction of rotation of the motor 6. The direction of rotation of the motor 6 is controlled by a plurality of directional contactors 82 and 92 for one direction of rotation and 134 and 138 for the other direction of rotation. A control relay 88 is associated with these directional contactors.

The directional contactors for motor 6 also control the time limit relay 13 of the electromagnetic type which in turn controls the rate of acceleration of motor 6 by shunting the accelerating resistor 109 a suitable interval of time after the motor 6 is energized.

To properly select the period during the cycle of operation of the main motor 39 for the feeding of the tool 208, a pair of selector switches 57 and 57' are provided. These selector switches may be independently closed so that either switch 57 is closed when switch 57' is open or switch 57' is closed when switch 57 is open. It may be desirable, however, to close both switches, thus providing for a feeding operation not only at the end of the cutting stroke but also at the end of the return stroke of the platen 204.

A pair of controllers 58 and 158 is also provided for selecting a feeding of the tool 208 either to the right or to the left by the operation of controller 58 or up or down by the operation of controller 158. Each of these controllers is provided with a segment and contact fingers such that the operation of one will preclude any useful operation of the other. For instance, if controller 58 be actuated, controller segment 61 opens the circuit at the contact fingers 62. Any attempt thereafter to effect feeding of the tool either up or down simply opens the circuit for the reversing motor 6 at the contact finger 76 by reason of the fact that the controller segment 77 is moved out of engagement with these fingers. The attendant may thus be apprised of the fact that the controllers are not in proper position for the desired operation if, upon actuation of one, no feeding operation takes place at either the end of the forward or cutting stroke or at the end of the return or non-cutting stroke.

The system of control shown in Figs. 1 and 1a is also provided with a measuring relay, or spring-reset limit switch 213, which is suitably geared to the reversing motor 6 when the electromagnetic clutch 103 is energized. The arrangement is such that the electromagnetic clutches 100, 103 and 200 are either energized very nearly at the same time or deenergized at very nearly the same time during certain operations of the system of control.

The spring-reset limit switch 213 is provided with a cam 121 which actuates a pivoted lever 126 through the roller 122. This pivoted lever 126 is designed to be adjustable with reference to the cam 121 by means of a handle 125 acting on a screw member disposed to coact with a suitable base. The handle 125 is provided with a graduated disc 124 cooperating with the scale 123. By suitable manipulation of the handle 125, the number of revolutions of the motor 6 can be very accurately controlled and, in consequence, the distance of the travel of the tool 208, that is, its feed, may be accurately selected.

The spring-reset limit switch 213 also controls the energization of electromagnetic clutches 100 and 200. This is a very desirable feature in the system of control since the greatest inertia of the moving parts when the motor 6 is operating resides in the armature of the motor and the gear mechanism for driving the feed screw. By the use of the magnetic clutches 100 and 200, the system of gears and the motor armature are disconnected the instant the tool has moved the distance selected by the spring-reset limit switch, and there is no possibility of getting an improper distance of feed by reason of overtravel caused by the inertia of the moving parts of the motor armature and the system of gears actuated by the motor.

When the cam 121 starts rotating, the lever 126 will, when the selected distance of travel for the tool 208 has been provided, contact the pivoted lever 127, thereby opening the circuit for the motor 6 at the contact members 74.

When the feeding operation is completed, the planer platen starts on its return movement, thereby opening the circuit for the coil 65 of the control relay 66. The deenergization of control relay 66 deenergizes the electromagnetic clutch 103 and, in consequence, the compression springs shown as cooperating with the disc 128 reset the limit switch 213 to its original position so that it can repeat its measuring operation when again called upon to do so at the point during the cycle of operation of the planer platen selected by the selector switches 57 and 57'.

The system of control is also provided with a starting contactor 53 and a plurality of traverse pushbutton switches R', L', U' and D'. These last-mentioned switches control the traverse movement of the tool 208 to the right, to the left, up, and down, respectively. A still better understanding of my invention may be had from a study of the sequence of operation for a selected feeding operation.

Assuming that buses 1 and 8 are suitably energized, a circuit is established from bus 1, through conductor 2 to bus 3, conductor 4, separately excited field winding 5 of the motor 6 and conductor 7 to the bus 8. Another circuit is established from the energized bus 3 through conductor 9, resistors 10 and 11, neutralizing coil 12 of the electro-magnetic time-limit accelerating contactor 13, and conductor 14 to the the bus 8. A further circuit is established from the conductor 9 through the contactors 15 of the relay 33 through the magnetizing coil 16 of the time-limit contactor 13 to the energized conductor 14. The time-limit contactor 13 is also provided with a low resistance short-circuited coil 17 and a spring assembly 18 whereby the time of operation, namely, the closing of contact members 108 and the opening of contact members 84, may be accurately controlled. In other words, these last-mentioned contact members are closed and opened, respectively, a definite interval of time after the opening of contact members 15 by operations explained hereinafter.

If the planer is to be operated,—assuming the platen is not in its extreme position but in such a position that dogs 72 and 72' have the relation shown in Fig. 1a with reference to the limit switches 205 and 206—and the attendant wishes to start the planer in the "cut" or forward direction, he depresses push-button switch 29', thereby establishing a circuit from the bus 3 through the closed contact members 19 of the limit switch 205, contact members 20, actuating coil 21 of the control relay 22, and stop push-button switch 23 to the bus 8. The operation of the control relay 22 immediately establishes a holding circuit for coil 21, which circuit may be traced from bus 3 through conductors 24 and 25, contact members 26, and conductor 27 to the coil 21. Since the operation of the control relay 22 closes the contact members 30 a circuit is established from bus 3 through closed contact members 19, conductor 28, closed contact members of push-button switch 29, contact members 30, actuating coil 31, and contact members 34 of the directional contactor 48 to the bus 8. No energizing circuit can be established for coil 47 of the directional contactor 48 because the attendant is at this moment, as just explained, actuating push-button switch 29'.

Energization of coil 31 causes the operation of the directional contactor 32, thereby immediately opening the contact members 46, thus preventing any energization of coil 47 of the directional contactor 48.

Contact members 44 are also opened, by the operation of the directional contactor 32 and conductor members 42 are closed. A circuit is thus established for the main motor 39 from the energized conductor 24 through conductor 35, back contact member 36 of the directional contactor 48, conductor 37, armature 38 of the main motor 39, conductor 41, contact members 42, and conductor 43 to bus 8. The field winding 40 of the main motor 39 is energized from any suitable source (not shown). Since the motor 39 is energized as just explained, the platen will be moved in the "cut" direction, and as it approaches its limit of travel, the dog 72 will operate lever 73 thus opening the contact members 19 and closing the contact members 70. Opening of the contact members 19 causes deenergization of coil 31, thus immediately closing the contact members 44 and 45.

Contact member 46 is designed to be delayed in its movement toward its closed position, and the time of its delay is so selected that the complete feeding operation of the tool will be effected before the contact members 46 close. The contact members 34 are of a design similar to the design of the contact members 46. Some delay for these contact members is desirable since an immediate closing of contact members 46 would cause the opening of the contact members 36 and thus prevent the stopping of the main motor 39 by dynamic braking, but by providing contact members 46 and 34 with a time constant both contact members 44 and 36 will remain closed at the end of the cut and return movement for an interval of time sufficient in length to stop the main motor 39 by dynamic braking by the circuit for the armature 38 through the contact members 44 and 36.

When contact members 46 close, the motor 39 will have come to rest, and coil 47 is energized by a circuit from bus 3 through contact members 219, conductor 220, push-button switch 29', contact members 36', contact members 46 of directional contactor 32, and actuating coil 47 of the directional contactor 48 to the bus 8. A circuit is thus established for the main motor 39, for reverse operation from the energized conductor 35 through contact members 44, conductor 41, armature 38, conductor 37, contact members 36', and conductor 43 to the bus 8. This cycle of operation, namely, a reciprocatory movement of the planer platen, continues as long as the planer is in operation.

If the attendant wishes to effect a feeding of the tool 208 toward the right, at the end of the cutting stroke, he will close selector switch 57 to the position shown and move controller 58 so that controller segments 59 and 64 bridge the contact fingers 60 and 63, respectively, and so that the controller segment 61 is moved out of engagement with the contact finger 62. The starting control relay 53 may then be energized by operation of the push-button switch 51, thus establishing an energizing circuit for coil 52 from the bus 1 through conductor 50, push button switch 51, coil 52, and conductor 43 to the bus 8. The starting control relay 53 establishes its own holding circuit through the contact members 51', and also by its operation closes the contact members 54 and 56 and opens the contact members 55.

As heretofore explained, at the end of the cutting stroke dog 72 causes closing of the contact member 70, thereupon establishing a circuit,—assuming starting control relay 53 has been operated,—from bus 1 through contact members 54, actuating coil 65 of control relay 66, conductors 67 and 68, selector switch 57, conductor 69, contact member 70 of the limit switch 205, conductor 71 and contact members 49 of directional contactor 48 to the bus 8. Operation of the control relay 66 causes a closing of the contact members 173 and 221. A circuit is thus established from the bus 1, through switches R', L', U' and D', conductor 172, contact members 173, contact members 74, controlled by the spring-reset limit switch or measuring relay 213, conductor 75, contact fingers 76, bridged by the controller segment 77, conductor 78, contact fingers 63, bridged by the controller segment 64, conductors 79 and 80, actuating coil 81 of the directional contactor 82, conductor 83, contact members 84 of accelerating contactor 13, and conductor 85 to bus 8.

A second circuit is established from the energizing conductor 172 through contact members 221 of control relay 66, actuating coil 102 of the electromagnetic clutch 103 and conductor 104 to the energized conductor 43. Operation of the clutch 103 thus mechanically couples the measuring relay 213 to the shaft of the motor 6 through the gearing systems 118 and 120 and shaft 119. The spring-reset limit switch or measuring relay 213 will thus be caused to operate in synchronism with the motor, the instant this motor starts its rotation.

A third circuit is established by the operation of relay 66, which circuit may be traced from the energized conductor 78 through conductor 95, contact members 56 of starting contactor 53, conductor 96, contact fingers 60 bridged by the controller segment 59, conductors 97 and 98, actuating coil 99 of the electromagnetic clutch 100 and conductor 101 to the bus 8.

The directional contactor 82 is provided with a contact member 86 which controls the operation of the directional contactor 92. Closing of contact members 86 energizes coil 87, whereupon contact members 90 and 139 are closed, and contact members 222 are opened. Closing of the contact members 90 establishes a circuit for the actuating coil 91 of the directional contactor 92 from the energized conductor 80 through coil 91, conductor 93, and contact members 90 to the energized conductor 83.

The instant directional contactor 92 is operated, contact members 94 and contact members 111 close. Closing of contact members 94 shunts out the contact members 84, thus preventing any further control of the directional contactor 92 by the time-limit relay 13. Furthermore, the closing of contact member 111 establishes the energizing circuit for motor 6. This circuit may be traced from bus 3 through contact members 105, conductor 110, the armature of motor 6, accelerating resistor 109, conductor 107, contact members 111, conductors 112 and 113, series field 114, and conductor 7 to the bus 8. The directional contactors 82 and 92 provide such a direction of operation of motor 6 that the tool 208 is fed toward the right through the transmission gearing systems 115 and 116 and magnetic clutch 100.

The motor 6 thereupon operates to feed the tool toward the right and also actuates the cam 121 in synchronism with its own armature. The instant tool 208 has moved a distance preselected by the measuring relay 213, the lever 126 actuates the lever 127, thereby opening the contact members 74. Opening of the contact members 74 not only disconnects the motor 6 from the source of supply, but also at substantially the same instant breaks the circuit for the magnetic clutch 100. The inertia of the motor armature and the transmission gearing can, therefore, in nowise effect the movement of the tool 208. The inertia of the tool itself and the few elements intermediate the clutch 100 and the tool are relatively low in inertia moving at a slow speed. Furthermore, the friction in the device is rather high so that no measurable drifting of the tool can be noticed after the contact members 74 open. Whether or not there may be a slight over-traveling of the motor armature 38 is thus unimportant, but the distance of travel of the tool, namely, its feed, is accurately determined by the setting of the measuring relay 213.

Since the single feeding operation is thus completed at the end of the cutting stroke and the tool 208 is at rest, actuating coil 47 is energized, as heretofore explained, and the planer platen is moved in its reverse direction, that is, completes its return movement, and the cycle may thus be repeated after a second cutting stroke has been effected. If the attendant had desired to effect a feeding toward the right at the end of both the cutting stroke and the return stroke, he would have closed both switches 57 and 57', and the cycle of operation just explained for motor 6 would be repeated both when limit switches 205 and 206 are actuated by the dogs 72 and 72' at the end of the cutting stroke and the return stroke, respectively. This should be apparent from an inspection of the circuits, since the opening of contact members 219 causes a reversing of the planer platen after a desired time interval and the closing of the contact members 223 causes energization of the actuating coil 65 of control relay 66.

If the feeding of the tool is to be toward the left, the controller 58 is moved so that controller segments 129 and 131 bridge the contact fingers 60 and 130, respectively, and controller segment 61 is out of engagement with the contact finger 62. The clutch 100 will be energized exactly in the manner it was energized for the feeding toward the right, but the directional contactors 134 and 138 will be energized. The circuit for directional contactor 134 may be traced from the energized conductor 78 through contact fingers 130, bridged by the controller segment 131, conductor 132, actuating coil 133 of the directional contactor 134, conductor 83, contact members 84 and conductor 85 to the bus 8. Operation of the directional contactor 134 closes the contact members 135 and 136. The closing of contact members 135 energizes the coil 87 of the control relay 88, thus closing the contact members 139, which effect the energization of actuating coil 137 of the directional contactor 138.

A shunt circuit is established for the contact members 84 by the operation of the directional contactor 138 by reason of the fact that contact members 140 are closed.

The circuit for the motor may be traced from bus 3 through contact members 136, conductor 107, accelerating resistor 109, the armature of motor 6, conductor 110, contact members 142, conductors 112 and 113, series field 114 and conductor 7 to the bus 8.

Regardless of the direction of rotation of the motor 6, the operation of the directional contactors energizes relay 33. The circuit for this relay may be traced from energized conductor 110, through conductor 110' and actuating coil 106 of relay 33, to the energized conductor 107. The instant the contact members 15 are opened, the magnetizing coil 16 of the electromagnetic time limit relay 13 is deenergized, and after a lapse of a predetermined interval of time, contact members 108 are closed, thereby shunting the accelerating resistor 109 and thus effecting a smooth acceleration of the motor 6.

Further, when the motor 6 is deenergized by the opening of the motor circuit by the actuation of the measuring relay 213 to open the contact members 74, the directional contactors which are energized will become deenergized, and in consequence the coil 87 of the control relay 88 will also become deenergized. When contact members 222 close, a dynamic braking circuit is established through the dynamic braking resistor 230, and the motor 6 is brought to rest by dynamic braking. During dynamic braking, coil 106 is energized by the counter electro-motive force of the motor 6 and contact members 15 are thus held open. The magnetizing coil 16 thus remains deenergized during dynamic braking, holding contact members 84 open. Since contact members 140 and 94 are also open, plugging of motor 6 is prevented during dynamic braking.

When the feeding operation is to be either up or down, the controller 58 is left in the position shown in Fig. 1, and the controller 158 is moved in such a direction as to effect either a downward feeding operation or an upward feeding operation of the tool 208. If the controller 158 be moved to effect a downward feeding operation, controller segment 179 bridges the contact fingers 160, thus establishing an energizing circuit from energized conductor 96 through contact fingers 160, bridged by the controller segment 179 and conductor 143, coil 144 of the electromagnetic clutch 200 and conductor 161 to bus 8. If the controller 158 be moved to effect a feeding operation in the upward direction, the actuating coil 144 is energized in exactly the manner just explained, except that controller segment 159 now bridges contact fingers 160; but the direction of operation of the motor 6 is different, since controller segment 194 bridges the contact fingers 191 for an upward feeding, whereas controller segment 195 bridges contact fingers 190 for a downward feeding.

When the tool 208 is to be moved toward the right or the left in one traverse movement or upwardly or downwardly in one movement, the manually operable switches R', L', U' and D' may be suitably actuated, depending upon the movement that is desired.

Assume that the tool 208 is at the extreme left in Fig. 2 and the attendant wishes to move it back to the right. He will thereupon actuate traverse switch R', opening its upper contact members to prevent any automatic operation and closing its lowermost and intermediate contact members. The closing of the lowermost contact members establishes a circuit for the directional contactors 82 and 92 through the conductor 80. The closing of the intermediate contact members establishes an energizing circuit for actuating coil 99 of the magnetic clutch 100 through the conductor 98. It will be noted that the lowermost and intermediate contact members of L' are connected to energize the directional contactors 134 and 138 and coil 99, respectively.

The lowermost and intermediate contact members of U' on the other hand are connected to energize directional contactors 82 and 92, and coil 144 respectively, whereas the lowermost and intermediate contact members of D' are connected to energize the directional contact members 134 and 138 and coil 144 respectively. It is thus apparent that any traverse movement desired can be effected by the appropriate operation of the switches R', L', U' and D'.

To effect manual adjustment of the tool-head the shaft of the motor is provided with a hand wheel, not shown. In order to secure the necessary mechanical connection between the motor 6 and the tool-head the starting contactor 53 is provided with the back contact members 55. When the tool-head is to be manually adjusted controllers 53 and 158 are actuated to the position desired and the clutch, of the clutches 100 and 200, selected is energized. The tool-head may thus be moved to the right or to the left, or up or down, as desired.

Applicant has in the foregoing specification illustrated but one specific embodiment of his invention specifically applied to a planer, but it should be apparent to those skilled in the art, after having had the benefit of the teaching of this invention, that it has general utility and may be applied to any other type of machine where a certain element is to be actuated a predetermined distance and not to exceed the preselected distance. Applicant, therefore, desires that the appended claims be interpreted in a general sense and not interpreted to be limited to a system of control for a planer, and that his invention be limited only by the terms of the claims and the pertinent prior art.

I claim as my invention:

1. In a system of control for controlling the distance of travel of a motor-operated machine element operating on a work piece, a motor for driving the machine element, a coupling for mechanically connecting said machine element to said motor, switching means for starting and stopping the motor, a second coupling interconnecting the motor and the switching means, and measuring means for preselecting the stopping position for said switching means to interrupt the energizing circuit for said motor and disconnect said machine element from said motor the instant said motor has rotated through a predetermined angle.

2. In a measuring control device, in combination, a machine element adapted to operate on a work piece, an electric motor for the machine element and means for successively starting and stopping the motor to shift the machine element with reference to the work piece after the motor has rotated through a predetermined angle, said means including a measuring device connected to the motor to operate in synchronism with the motor, said machine element being connected to said motor by a different connection than the connection between the measuring device and the motor and thus also operating in synchronism therewith, and means responsive to the measuring device adapted to effect the substantially simultaneous disconnection of said element from said motor to stop said element and the interruption of the motor circuit the instant said motor has operated through an angle selected by said measuring device.

3. In a control system, in combination, an electric motor, a machine element comprising a cutting tool disposed to operate on a work piece, and a connection between the element and the motor whereby the element is driven by said motor, a source of electrical energy for the control system and the motor, means adapted to effect energization of said motor from said source, and measuring means driven by said motor through independent connections and adapted to deenergize the motor and adapted to effect a disconnection of said element from the motor, whereby the motor is deenergized at a substantially preselected angular position of the armature of the motor relative to its initial angular position and whereby the machine element is stopped after having been actuated a predetermined distance.

4. In a control system for a planer, in combination, an electric motor having an armature, a source of electrical energy for the control system, a cutting tool, means for connecting the motor to the source of energy and the tool to the motor armature, and means actuated by said motor and adapted to disconnect the tool from the motor armature and the motor from the source when the motor armature has assumed a predetermined angular position relative to its initial angular position.

5. A control system for controlling the distance of feed of a machine element comprising, in combination, a reversing motor, a machine element, an electromagnetic clutch adapted to connect the element to the reversing motor whereby the element may be moved in the one or the other direction in a given path, an electromagnetic clutch adapted to connect the element to the reversing motor whereby the element may be moved in the one or the other direction in a path at right angles to the first-mentioned path, selecting means for selecting the direction of rotation of the motor and for selecting the electromagnetic clutch to be energized, and means responsive to a predetermined angular movement of the motor to deenergize the electromagnetic clutch selected to be energized by the selecting means.

6. A control system for controlling the distance of feed of a machine element, in combination, a reversing motor, a machine element, an electromagnetic clutch adapted to connect the element to the reversing motor whereby the element may be moved in the one or the other direction in a given path, an electro-magnetic clutch adapted to connect the element to the reversing motor whereby the element may be moved in the one or the other direction in a path at right angles to the first-mentioned path, selecting means for selecting the electro-magnetic clutch to be energized, means responsive to a predetermined angular movement of the motor to deenergize the electro-magnetic clutch selected to be energized by the selecting means, means responsive to a predetermined angular movement of the motor to deenergize the motor, and means for establishing a dynamic braking effect in the motor to stop the motor.

7. In a measuring control device, in combination, an electric motor, a motor driven cutting element in a machine operating on work pieces, and means for successively starting and stopping the motor after the motor has rotated through a predetermined angle, including, the motor driven cutting element, the motor, a coupling between the element and the motor whereby the element is caused to operate in synchronism with the motor, a measuring device, a second coupling for connecting the measuring device to the motor whereby said measuring device is caused to operate in synchronism with said motor, and means responsive to the measuring device adapted to effect the substantially simultaneous disconnection of said element from said motor to stop said element and the interruption of the motor circuit the instant said motor has operated through an angle selected by said measuring device.

8. In a system of control for electric motors operating the tool of a reciprocatory cutting machine, in combination, a motor, a source of electrical energy, a reciprocating member driven by said motor, means operated by the reciprocating member to reverse the interconnection between the motor and the source of energy to thus effect automatic reciprocation of the reciprocating member, a second motor having an armature, means adapted to connect said second motor to said source of energy when the reciprocating member is in a given position, switching means adapted to disconnect said second motor from said source of energy to thus stop the motor, an adjustable measuring device adapted to preselect the time of operation of said switching means when the armature of the second motor has operated through any angle selected by said adjustable measuring device, a cutting machine element, a coupling between the second motor and the element, and means responsive to said measuring device adapted to break the coupling between the element and the motor at the same time said switching means are caused to operate to disconnect said second motor from said source of energy.

9. A system of control for motors, in combination, a reversible motor, a source of energy, a reciprocating member coupled to said motor and adapted to reverse the connection between the motor and the source of energy whereby said reciprocatory member is reciprocated, a second motor, an adjustable reset measuring device, a coupling between the second motor and the measuring device, a machine element, a coupling between the element and the second motor, means adapted to connect said second motor to said source of energy when the member is in a given position, means responsive to the operations and adjustment of the measuring device to substantially simultaneously disconnect said element from said second motor and to deenergize said second motor, and means for disconnecting said measuring device from the second motor when said member is in a position other than said given position whereby said measuring device automatically resets itself for a second operation.

10. In a measuring control system for a planer having a platen in combination, a motor for reciprocating the platen carrying a work piece, a cutting tool disposed to operate on the work piece, a second motor for shifting the tool, a coupling between the tool and the second motor, means for periodically starting said second motor, a second coupling, measuring means driven by the second motor through said second coupling, and switching means energized when said platen is at one end of its reciprocatory motion and responsive to the measuring means disposed to stop the motor, after each starting, when the motor has rotated through a predetermined angle, said first-named coupling means being also responsive to the measuring means whereby said operative connection between the tool and the second motor is broken to thus effect the stopping of the tool at the instant the second motor has rotated through a predetermined angle.

11. In a measuring control device for a motor-driven machine element operating on a work piece to remove material therefrom to shape it, means for successively starting the motor to shift the machine element with reference to the work piece after the motor has rotated through a predetermined angle, said means including a measuring device connected to the motor to operate in synchronism with the motor, and a connection between the motor and the machine element, and means responsive to the measuring device adapted to effect the substantially instantaneous disconnection of said machine element from the motor the instant said motor has operated through an angle selected by said measuring device.

GEORGE E. KING.